United States Patent
Matsushita et al.

(10) Patent No.: US 7,570,407 B2
(45) Date of Patent: Aug. 4, 2009

(54) SCANNING MECHANISM, METHOD OF MACHINING WORKPIECE, AND MACHINE TOOL

(75) Inventors: Naohisa Matsushita, Kawasaki (JP); Toshikazu Furui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 12/030,309

(22) Filed: Feb. 13, 2008

(65) Prior Publication Data
US 2008/0198434 A1   Aug. 21, 2008

(30) Foreign Application Priority Data
Feb. 19, 2007   (JP) .............................. 2007-038183

(51) Int. Cl.
*G02B 26/08* (2006.01)
(52) U.S. Cl. ................................ 359/210.1; 359/209.1
(58) Field of Classification Search .................. None
See application file for complete search history.

(56) References Cited

U.S. PATENT DOCUMENTS

| | | | |
|---|---|---|---|
| 5,253,245 A * | 10/1993 | Rabedeau | ................... 369/119 |
| 5,897,798 A | 4/1999 | Monberg et al. | |
| 5,910,262 A | 6/1999 | Baumgart et al. | |
| 5,951,891 A | 9/1999 | Barenboim et al. | |
| 5,952,058 A | 9/1999 | Xuan | |
| 6,013,336 A | 1/2000 | Baumgart et al. | |
| RE38,165 E * | 7/2003 | Macken | ................... 359/201.1 |

FOREIGN PATENT DOCUMENTS

| | | |
|---|---|---|
| JP | 63-303237 | 12/1988 |
| JP | A 10-314972 | 12/1998 |
| WO | WO 97/48519 | 12/1997 |

* cited by examiner

*Primary Examiner*—James Phan
(74) *Attorney, Agent, or Firm*—Greer, Burns & Crain, Ltd.

(57) ABSTRACT

A scanning mechanism that scans a scanning object with a light beam has light-collecting means for collecting the light beam that is emitted by a light source; driving means for driving the light-collecting means in a direction orthogonal to an optical axis of the light-collecting means; first reflecting means provided near a first side of the scanning object, for reflecting the light beam collected by the light-collecting means to allow the light beam to be incident on the scanning object; and second reflecting means provided near a second side of the scanning object that is opposite to the first side of the scanning object, for reflecting the light beam collected by the light-collecting means to allow the light beam to be incident on the scanning object.

21 Claims, 16 Drawing Sheets

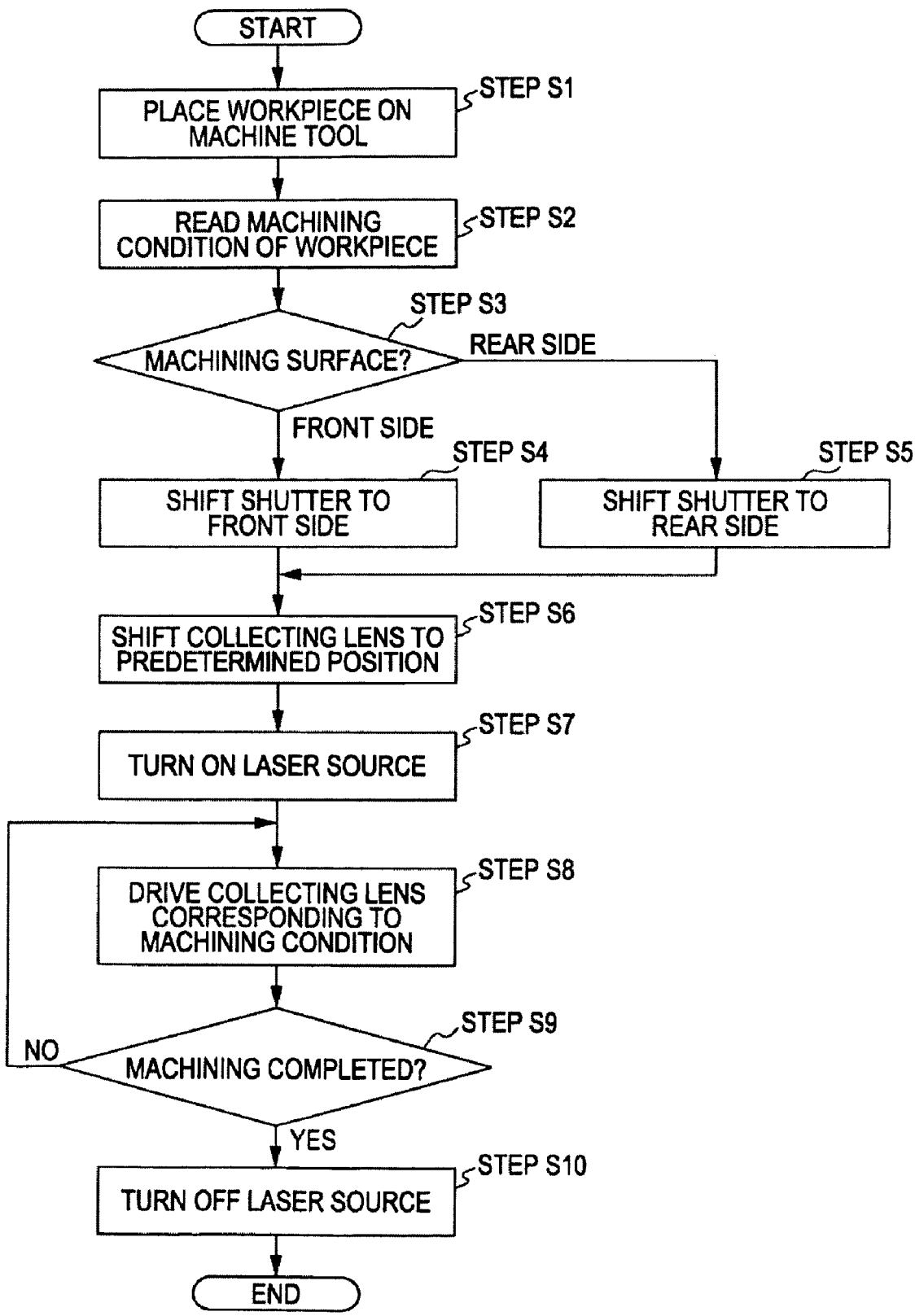

SCANNING MECHANISM, METHOD OF MACHINING WORKPIECE, AND MACHINE TOOL

BACKGROUND

The present invention relates to a scanning mechanism that performs scanning with a light beam such as a laser beam. The present invention also relates to a method of machining various types of workpieces, and to a machine tool.

To machine various types of workpieces, laser machining is typically used. For the laser machining, a laser beam is emitted on a surface of a workpiece by a laser oscillator. Modern laser machining requires that the emitted laser beam be guided by optical elements such as a lens and a mirror, to scan a desired position of the workpiece.

Laser machining currently works as follows.

In the first type, a high power laser oscillator is used and applied to high intensity, high speed welding. For example, the automobile industry uses this type of laser machining.

In the second type, a low power laser oscillator is used and applied to micromachining. For example, a business category such as the electronic industry uses this type of laser machining. When laser machining is applied to micromachining, a laser beam has to be collected into a fine spot with a diameter of 100 μm or smaller so as to irradiate a machining object with the collected light beam for machining.

Examples of micromachining members include a suspension used in a magnetic disk unit, and a head gimbal assembly (HGA) in which a magnetic head slider is mounted at a tip of a suspension. These members visually require adjustment machining for the roll angle, pitch angle, and spring pressure thereof. In a case where a laser formation technique is applied to such adjustment machining, since the members are becoming more miniaturized and hence the angles and spring pressure have to be finely adjusted, the diameter of a laser beam to be emitted on the members is desired to be as fine as about 10 to 30 μm.

In addition, in the above-mentioned adjustment machining, the angles and spring pressure of the members have to be adjusted, in both plus and minus directions. Thus, a laser beam must be collected to scan both front side and rear side of the HGA for the suspension, as a workpiece.

Meanwhile, when laser machining is being performed, the temperature of the member decreases, as thermal energy accumulated in a portion of the member irradiated with the laser beam diffuses around the member. However, as the machining members are becoming more miniaturized, the speed of decrease in temperature by diffusion of the thermal energies reduced. As a result, the portion of the machining member irradiated with the laser beam tends to become overheated. Therefore, it may be difficult to keep providing an efficient forming condition. Thus, a heat gain through the laser scanning is necessary to be reduced and stabilized.

FIG. 1 is an illustration showing an example of an optical scanner of a related art capable of scanning both front and rear sides of a workpiece with a laser beam.

The optical scanner shown in FIG. 1 has laser oscillators for both the front side and the rear side of a workpiece, a plurality of galvano scanners that perform scanning using laser beams emitted by respective laser oscillators, and a plurality of fθ lenses (telocentric lenses) that collect the laser beams for scanning from respective galvano scanners and determine irradiation positions of the laser beams. With the optical scanner shown in FIG. 1, the laser beams can be positioned at high speed.

FIG. 2 is an illustration showing another example of an optical scanner of the related art.

In the scanner shown in FIG. 2, a split unit splits a laser beam emitted by a single laser oscillator into two laser parts. Then, optical fibers guide the first laser part to a front-side irradiation unit that irradiates a front side of a workpiece with the first laser part, and guide the second laser part to a rear-side irradiation unit that irradiates a rear side of the workplace with the second laser part.

The front-side and rear-side irradiation units include optical systems that collect laser beams on surfaces of the workpiece. Also, the irradiation units are connected to an actuator via a supporting member, so as to be driven in a direction indicated by an arrow in the drawing (in a plane). The scanning of the laser beam on the front and rear sides of the workpiece can be performed by driving the irradiation units.

FIG. 3 is an illustration showing still another example of an optical scanner of the related art. FIG. 3 is a modification of the optical scanner shown in FIG. 2. While the workpiece is fixed in the optical scanner shown in FIG. 2, irradiation units are fixed and a workpiece is connected to an actuator in the optical scanner as shown in FIG. 3.

The workpiece is shifted in a plane indicated by an arrow in the drawing by driving the actuator. Accordingly, laser beams emitted by the irradiation units can scan surfaces of the workpiece (See Japanese Unexamined Patent Application Publication No. 5-164987)

The optical scanner shown in FIG. 1 can perform positioning at high speed as described above. However, the galvano scanner serving as a scanning mechanism is expensive, and hence, the entire price of the optical scanner becomes expensive.

In contrast, the optical scanner shown in FIG. 2 or 3 employs a relatively simple mechanism for guiding the laser beam, thereby reducing the cost. However, since the optical fiber is used, it is difficult to decrease the spot diameter of the laser beam to be equal to or smaller than the core diameter of the optical fiber. Hence, the optical fiber cannot be used for fine machining.

In particular, the optical scanner that is shown in FIG. 3 shifts the workpiece. If the workpiece is large and heavy, a drive source such as a large actuator is required for positioning of the scanning position. Further, positioning at high speed or with high accuracy is relatively difficult.

An object of the present invention is to provide a scanning mechanism that can overcome the above problems. Also, another object of the present invention is to provide a method of machining a workpiece and to provide a machine tool that can overcome the above problems.

SUMMARY

According to one aspect of the disclosure, a scanning mechanism has light-collecting means for collecting the light beam that is emitted by a light source; and driving means for driving the light-collecting means in a direction orthogonal to an optical axis of the light-collecting means. First reflecting means are provided near a first side of the scanning object, for reflecting the light beam collected by the light-collecting means to allow the light beam to be incident on the scanning object. Second reflecting means provided near a second side of the scanning object that is opposite to the first side of the scanning object, for reflecting the light beam collected by the light-collecting means to allow the light beam to be incident on the scanning object.

According to another aspect of the disclosure, a scanning mechanism that scans a scanning object with a light beam has splitting means for splitting the light beam that is emitted by a light source into a first component and a second component. First light-collecting means collects the first component; and second light-collecting means collects the second component. First reflecting means reflects the first component emitted from the first light-collecting means to allow the first component to be emitted on a first side of the scanning object; and second reflecting means reflects the second component emitted from the second light-collecting means to allow the second component to be emitted on a second side of the scanning object. Driving means drives the first light-collecting means and the second light-collecting means in a direction orthogonal to an optical axis of each light-collecting means.

According to still another aspect of the disclosure, a scanning mechanism that scans a scanning object with a light beam has splitting means for splitting the light beam that is emitted by a light source into a first component and a second component. First reflecting means reflects the first component to allow the first component to be emitted on a first side of the scanning object; and second reflecting means reflects the second component to allow the second component to be emitted on a second side of the scanning object. First light-collecting means collects the first component; and second light-collecting means collects the second component. Driving means drives the first light-collecting means and the second light-collecting means in a plane orthogonal to an optical axis of each light-collecting means.

According to a further aspect of the disclosure, a scanning mechanism that scans a scanning object with a light beam has: first reflecting means for reflecting an incident first light beam to allow the first light beam to be emitted on a first side of the scanning object; and second reflecting means for reflecting an incident second light beam to allow the second light beam to be emitted on a second side of the scanning object. First light-collecting means collects the first light beam; and second light-collecting means collects the second light beam. Driving means drives the first light-collecting means and the second light-collecting means in a plane orthogonal to an optical axis of each light-collecting means.

According to another aspect of the disclosure, a machine tool irradiates a front side and/or a rear side of a workpiece with a laser beam to machine the workpiece. The machine tool has a stage on which the workpiece is placed, a laser source that emits the laser beam, light-collecting member that collects the laser beam emitted by the laser source, and a driver that drives the light-collecting means in a plane orthogonal to an optical axis of the light-collecting member. A first reflecting member reflects the laser beam collected by the light-collecting member to the front surface of the workpiece when the light-collecting member is located in a first region, and a second reflecting member reflects the laser beam collected by the light-collecting member to the rear surface of the workpiece when the light-collecting member is located in a second region. A controller controls the laser source and the driver.

BRIEF DESCRIPTION OF THE DRAWINGS

FIG. 16 is an illustration showing an embodiment of a laser machining procedure.

DESCRIPTION OF THE PREFERRED EMBODIMENTS

An embodiment of a laser scanner is described below with reference to the drawings.

Figure 1:
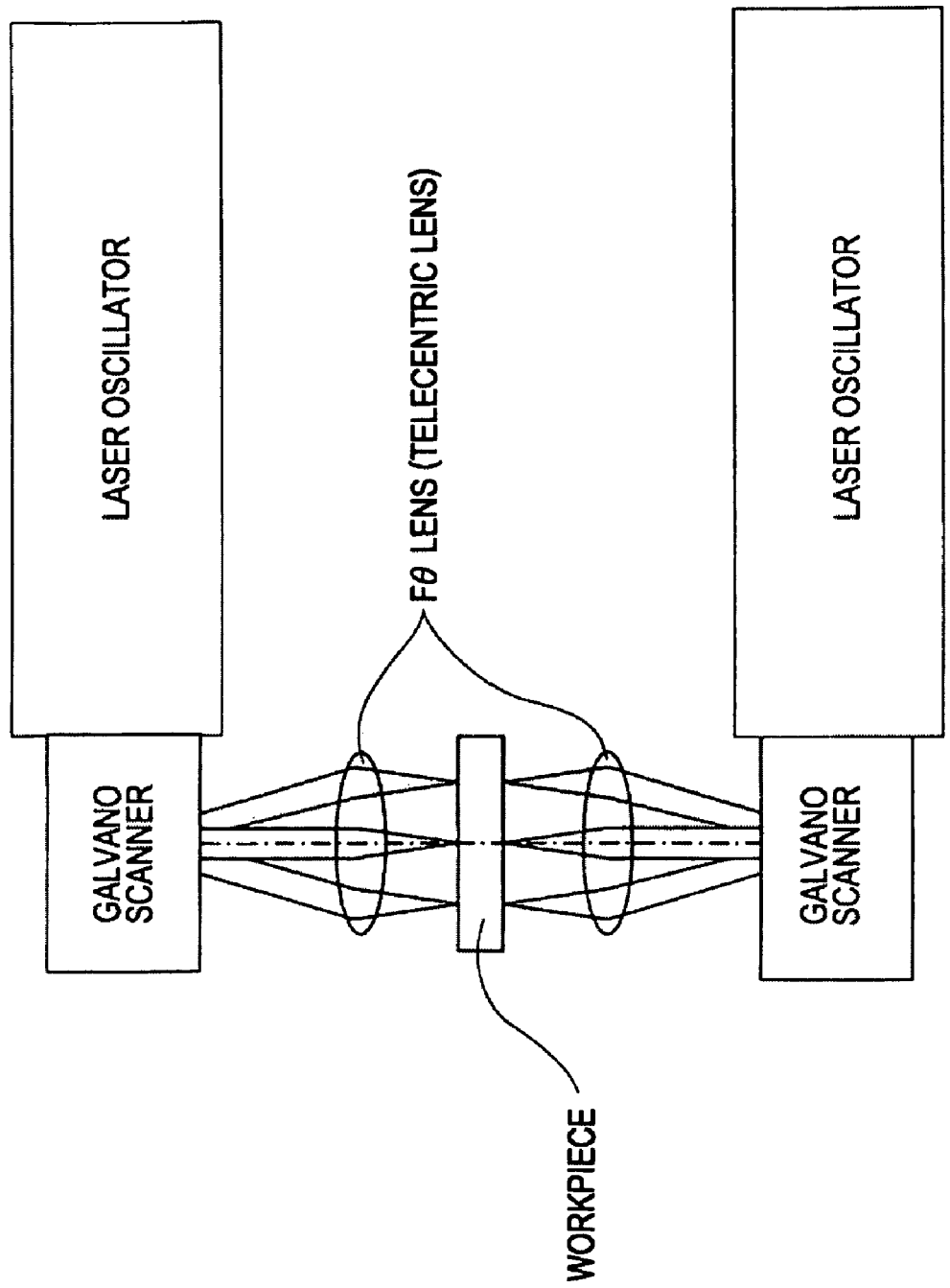
FIG. 1 is an illustration showing an example of an optical scanner of a related art.
Figure 2:
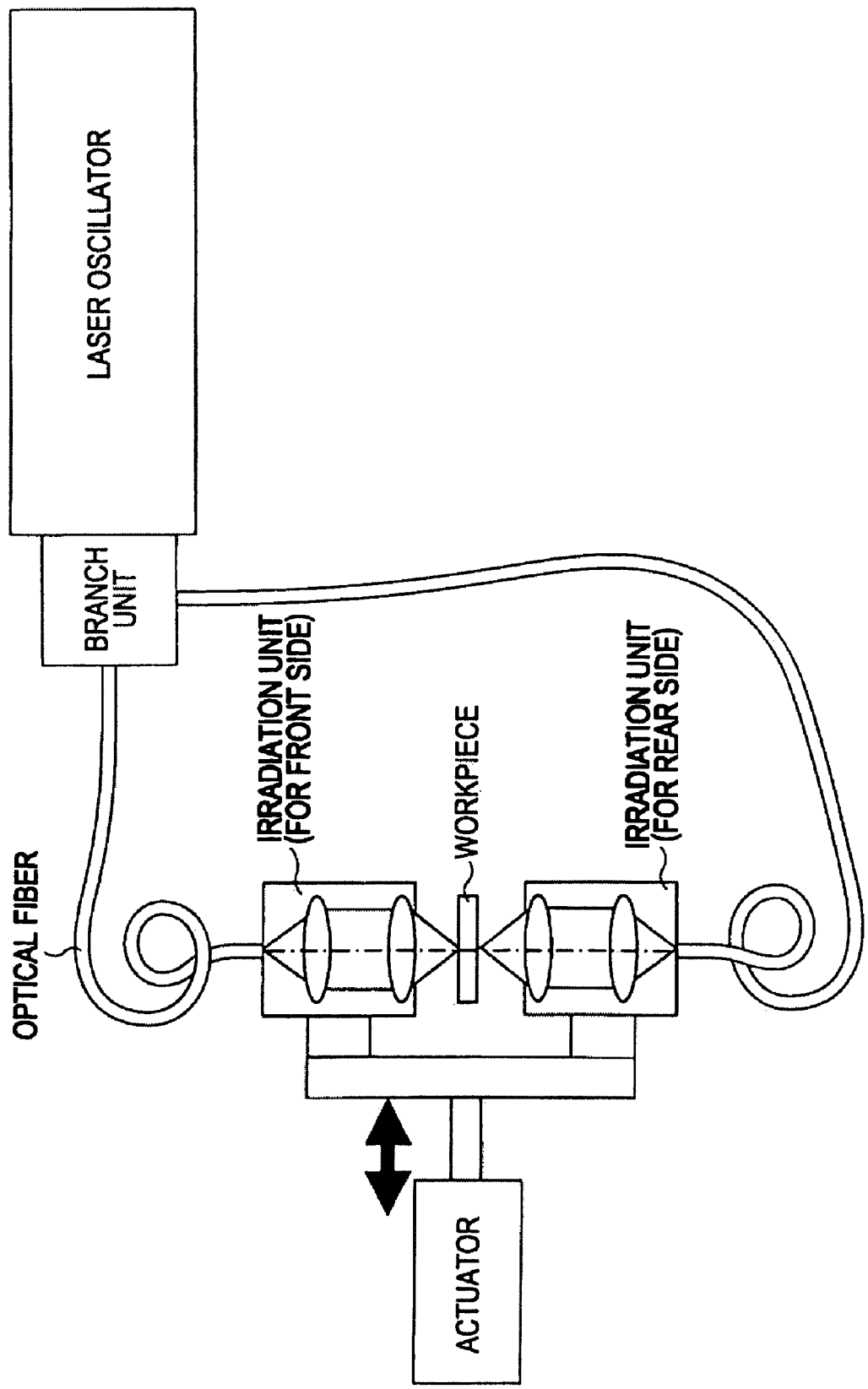
FIG. 2 is an illustration showing another example of an optical scanner of the related art using an optical fiber.
Figure 3:
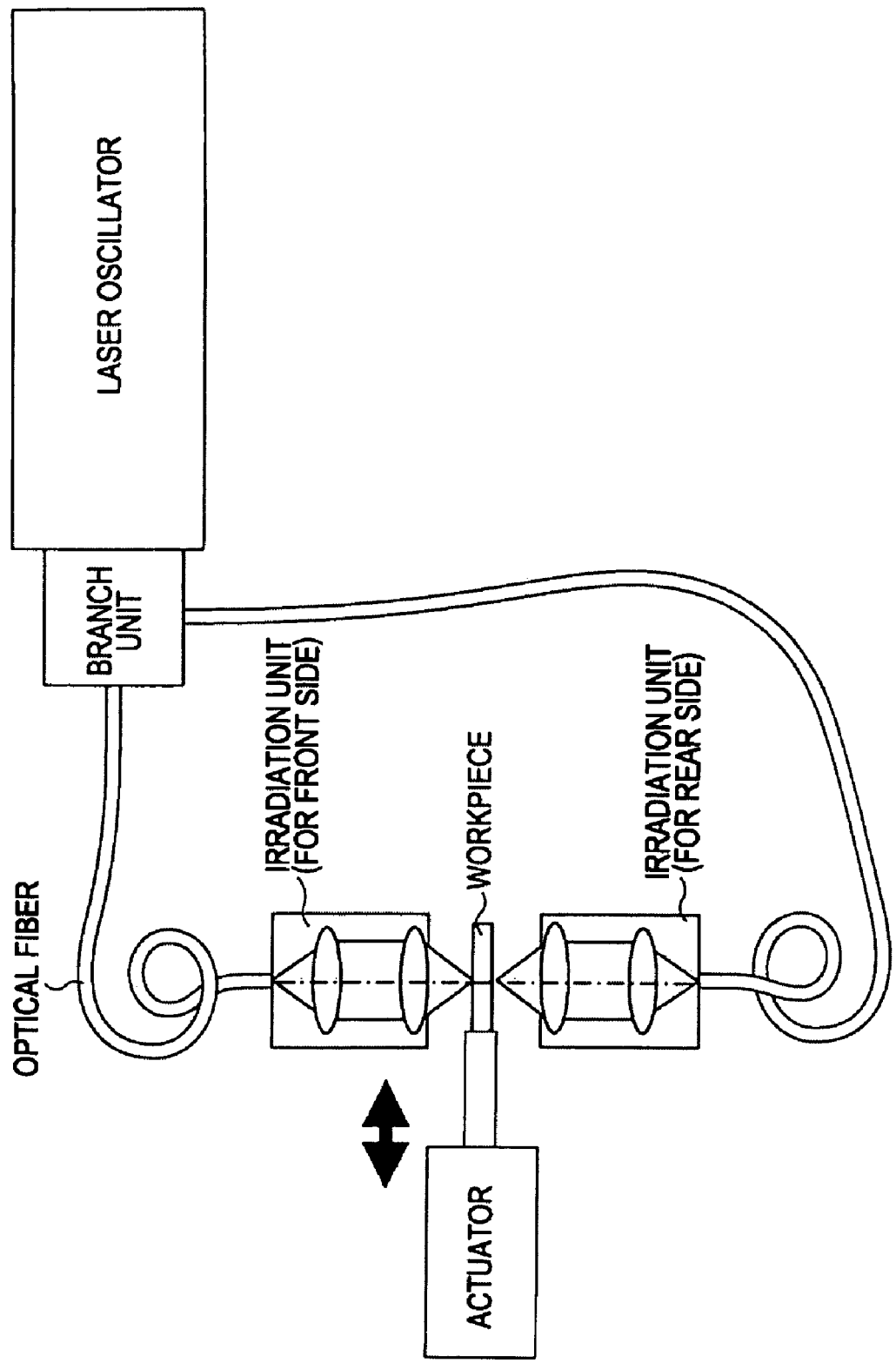
FIG. 3 is an illustration showing still another example of an optical scanner of the related art that drives and scans a workpiece.
Figure 4:
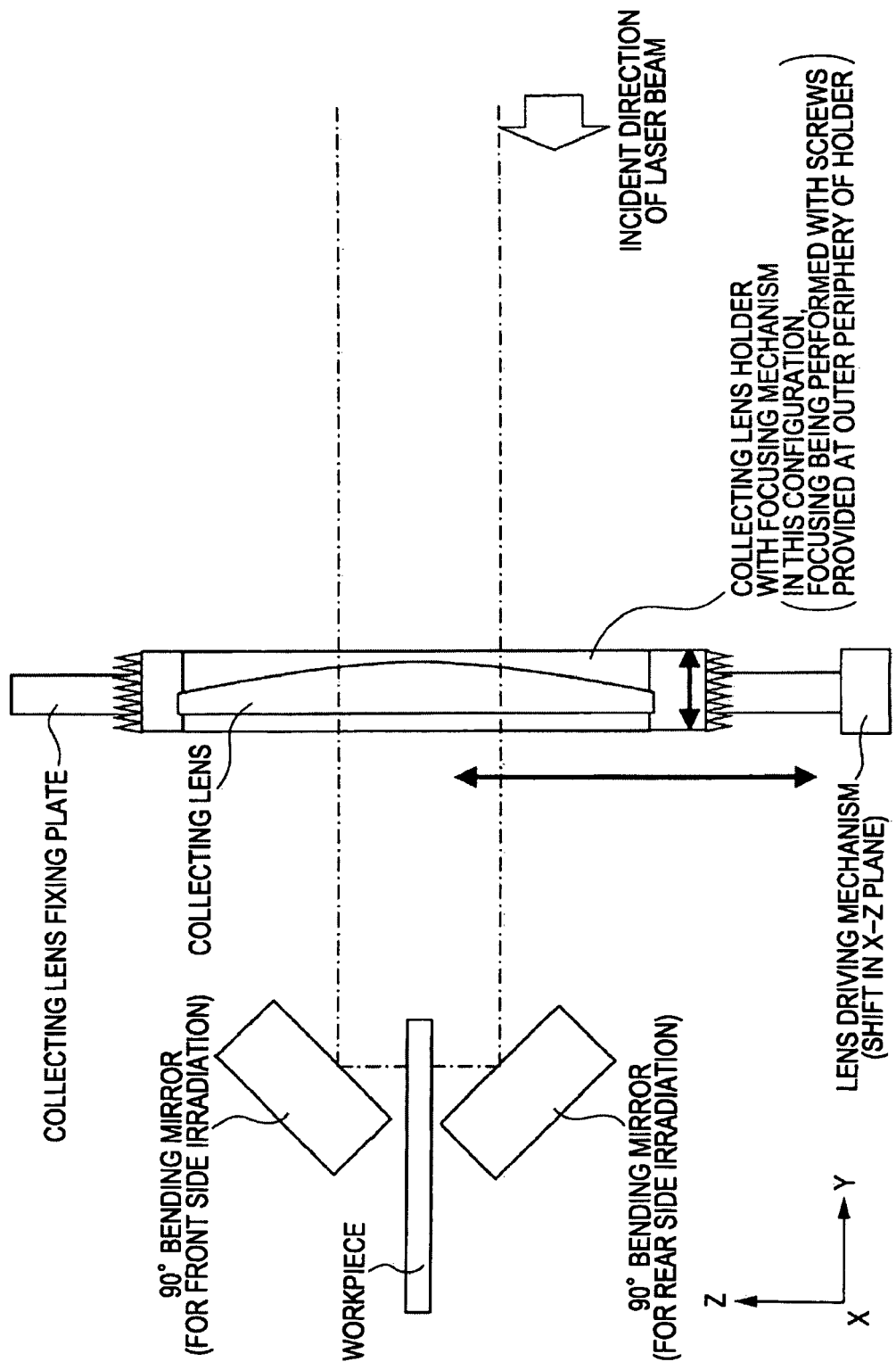
FIG. 4 is an illustration showing a configuration of an embodiment of an optical scanner made according to the present invention.

FIG. 4 is an illustration showing a brief configuration of a laser scanner according to an embodiment.

The laser scanner of this embodiment includes a collecting lens that collects a laser beam emitted by a laser source (not shown), and a collecting lens holder that supports the collecting lens. The collecting lens holder has screws provided on the outer periphery thereof. The screws are screwed into a collecting lens fixing plate. Accordingly, by rotating the collecting lens holder, the collecting lens holder can be shifted in Y-axis direction in the drawing, that is, in a direction indicated by a horizontal arrow in FIG. 4, and a focal position of the laser beam can be adjusted to be located on a surface of a workpiece.

The collecting lens fixing plate can be shifted by a lens driving mechanism in X-Z plane in the drawing, that is, in a double-head arrow extending in a vertical direction in the drawing.

A front-side bending mirror and a rear-side bending mirror are provided near a workpiece. The front-side bending mirror allows a front side of a workpiece to be irradiated with a laser beam, whereas the rear-side bending mirror allows a rear side of the workpiece to be irradiated with a laser beam. Each bending mirror bends the laser beam incident in the Y-axis direction in the drawing by 90 degrees, so as to irradiate the workpiece with the laser beam in Z-axis direction in the drawing, that is, in a direction orthogonal to the workpiece. A dotted chain line in FIG. 4 is an imaginary line corresponding to the locus of the laser beam, the line being plotted with reference to a laser irradiation position on a workpiece.

In the laser scanner of this embodiment, the irradiation position of the laser beam on the workpiece can be changed, by shifting the collecting lens in X-Z plane direction in FIG. 4.

Figure 5:
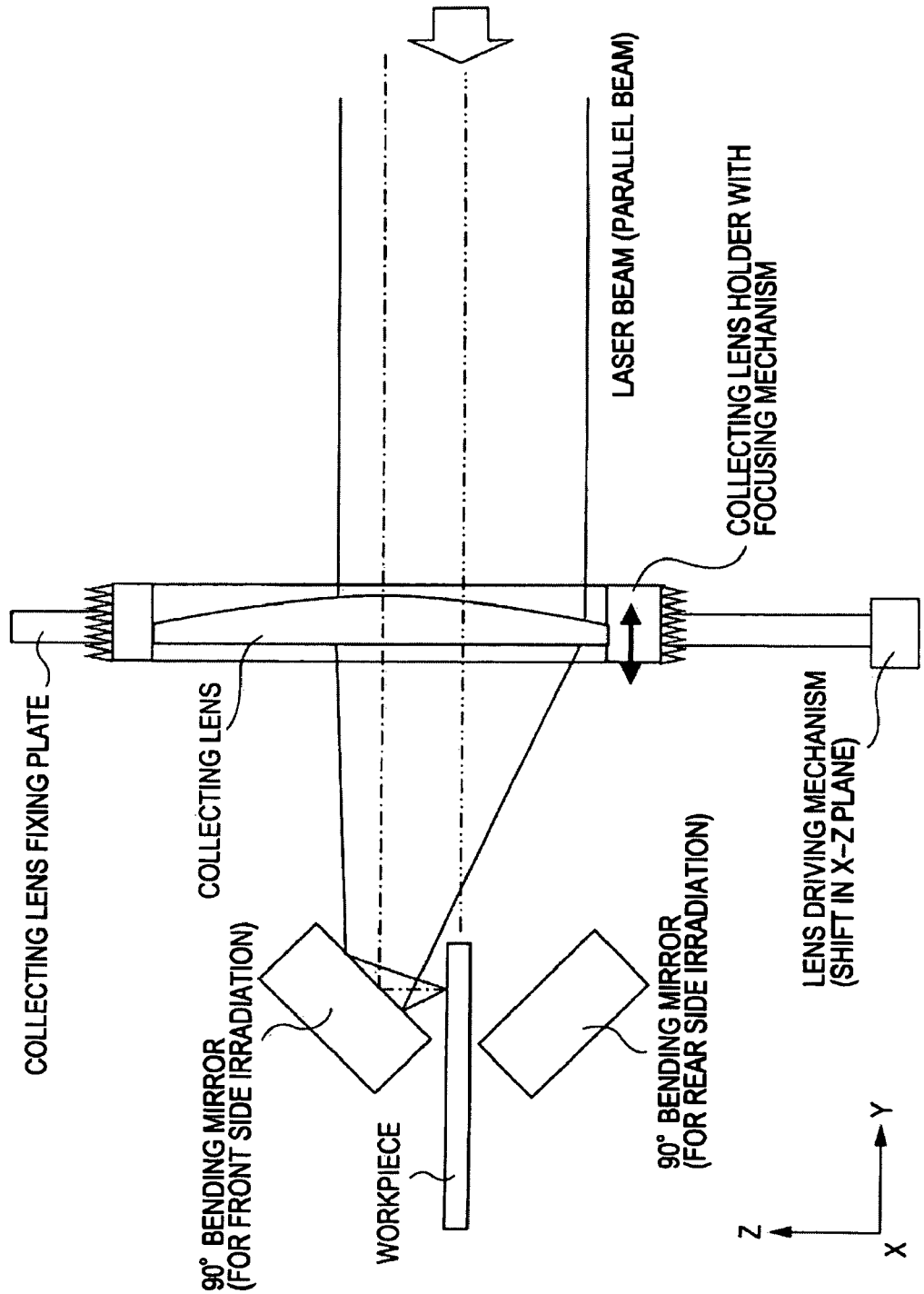
FIG. 5 is an illustration showing an operation of the optical scanner according to an example.

FIG. 5 is an illustration showing a laser irradiation operation for a front side of a workpiece. In the drawing, a two-dotted chain line represents an optical axis of a laser beam of a parallel beam incident on the collecting lens. In the example of FIG. 5, the optical axis of the laser beam corresponds to an extension direction of the workpiece. In FIG. 5, the position of the collecting lens relatively shifts in +Z direction as compared with the state shown in FIG. 4. The laser beam incident on the collecting lens is bent by the collecting lens in the +Z direction, and is incident on the front-side bending mirror. The laser beam incident on the front-side bending mirror is reflected such that its optical axis corresponds to the Z-axis direction, and is incident on the front side of the workpiece. In the example of FIG. 5, the laser beam reflected by the front-side bending mirror is orthogonally emitted on the front side of the workpiece.

Figure 6:
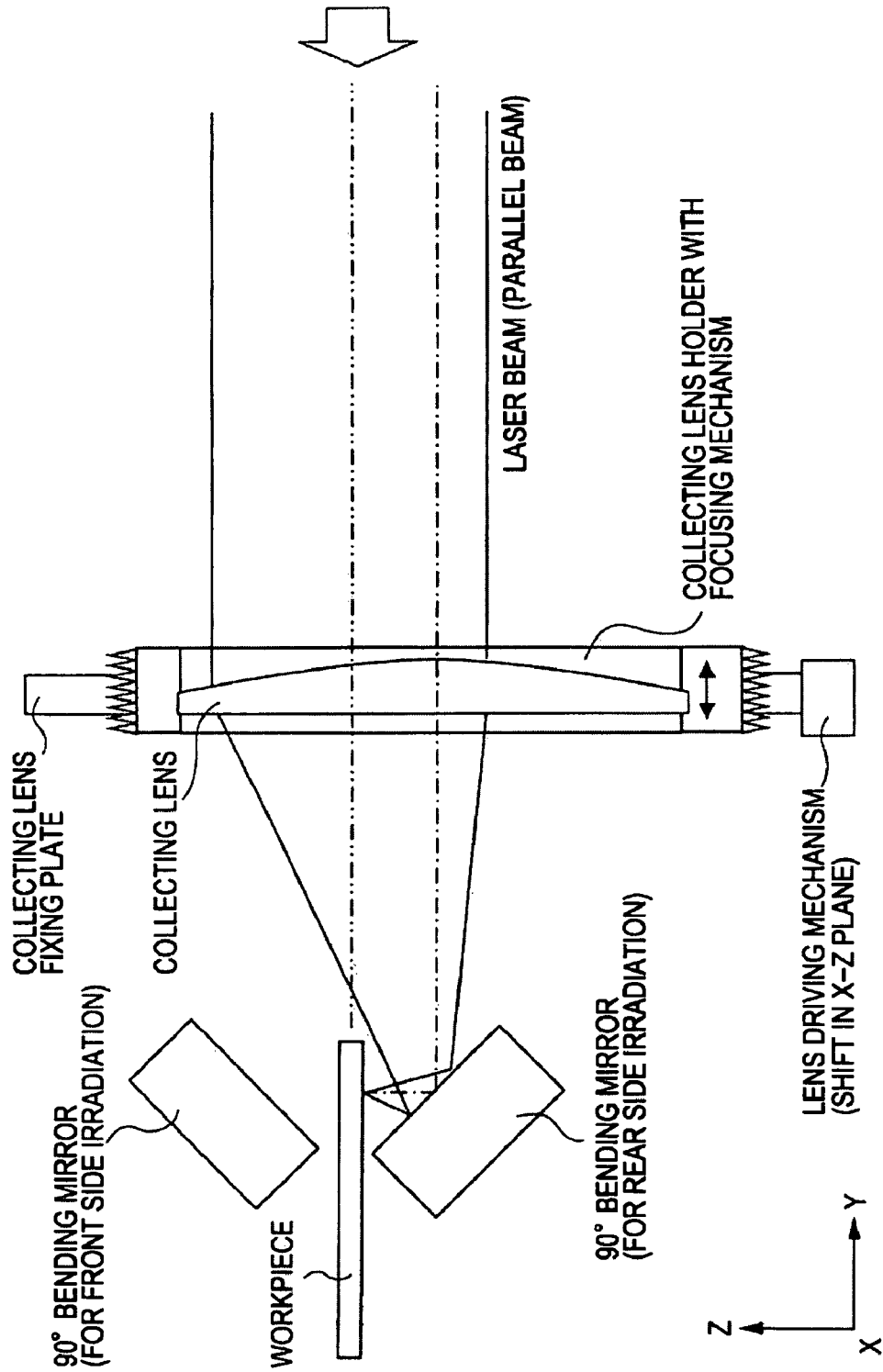
FIG. 6 is an illustration showing an operation of the optical scanner according to the example.

FIG. 6 is an illustration showing a laser irradiation operation for the rear side of the workpiece. In FIG. 6, the collecting lens relatively shifts in −Z direction as compared with the case in FIG. 4. The laser beam incident on the collecting lens is bent in the −Z direction, and is incident on the rear-side bending mirror. The laser beam reflected by the rear-side bending mirror is emitted on the rear side of the workpiece such that its optical axis corresponds to the Z-axis direction, like the case in FIG. 5.

As described above, in the laser scanner of this embodiment, the irradiation position of the laser beam on the workpiece can be changed, by shifting the single collecting lens in a plane orthogonal to the optical axis of the laser beam. In particular, the laser scanner shown in any of FIGS. 4 to 6 can selectively irradiate the front or rear side of the workpiece using the single light source.

Figure 7:
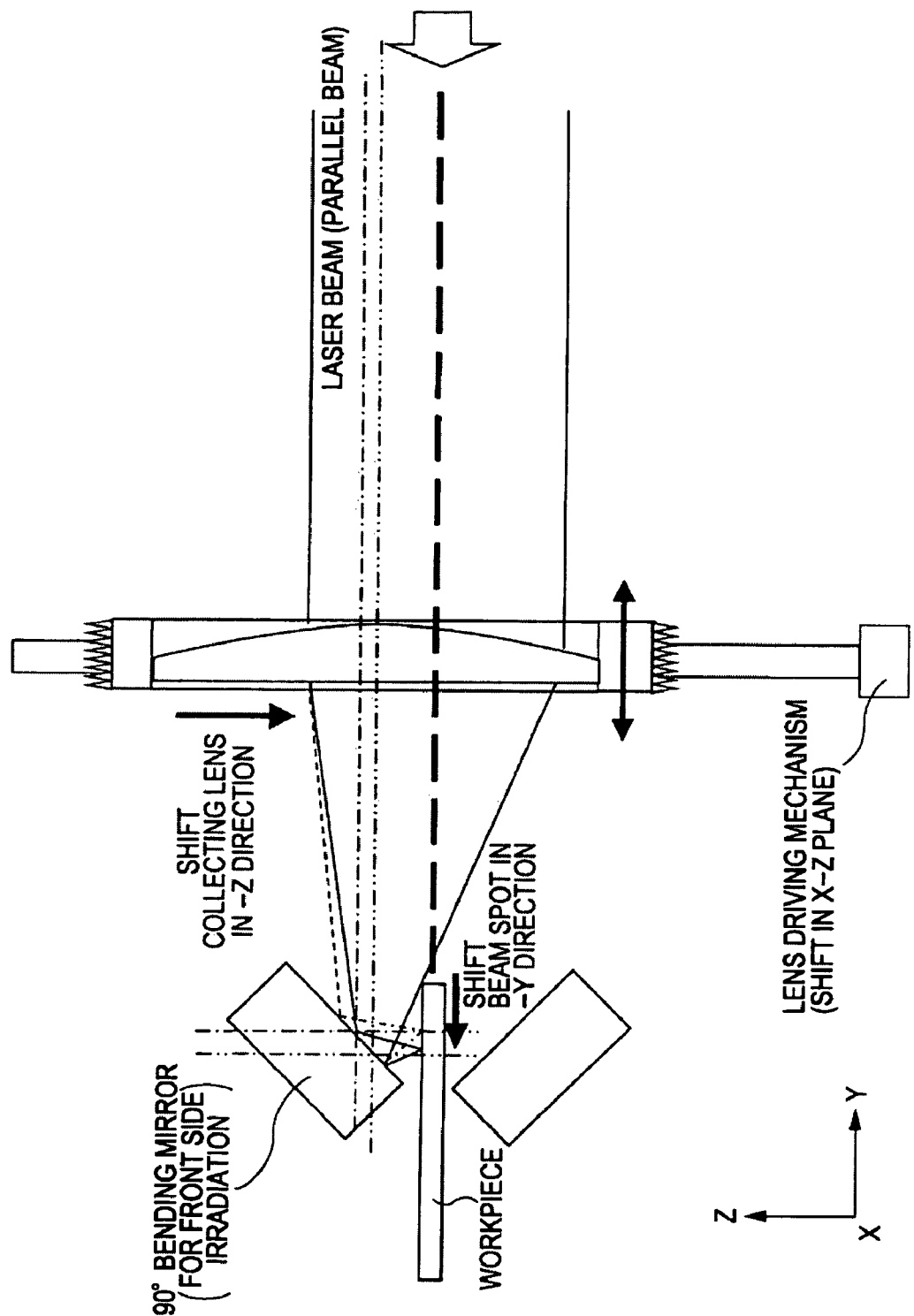
FIG. 7 is an illustration showing an optical scanning operation of the optical scanner according to the example.
Figure 8:
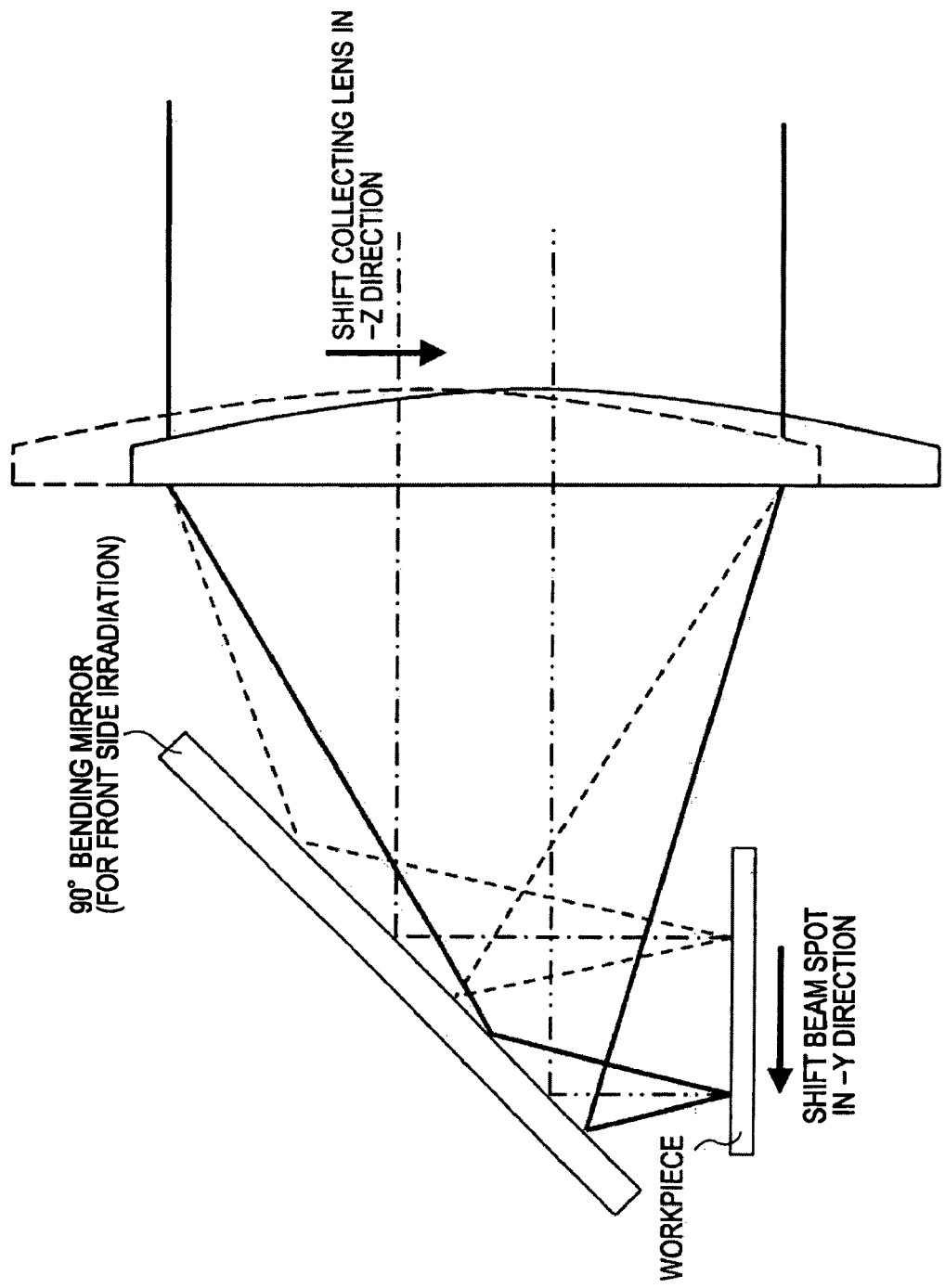
FIG. 8 is an enlarged view showing a primary portion in FIG. 7.

FIG. 7 is an illustration showing a laser scanning operation of the laser scanner of this embodiment. FIG. 8 is an enlarged view showing a primary portion in FIG. 7. Referring to FIGS. 7 and 8, laser scanning along the Y-axis direction in the drawing is described.

A thick dotted line in the drawing represents the optical axis of the laser beam incident on the collecting lens. It is assumed that, in an initial state, the collecting lens is located at a position indicated by a dotted line in FIG. 8. In this state, the laser beam is incident on a surface of a workpiece along an axis indicated by a dotted chain line in FIG. 7 or 8. The locus of the laser beam at this time is indicated by a thin dotted line.

Then, the collecting lens is shifted in the −Z direction in the drawing. The laser beam is gradually shifted in −Y direction accordingly. As described above, scanning of the laser beam in the −Y direction can be performed by shifting the collecting lens in the −Z direction. When the collecting lens is shifted to the position indicated by a solid line in FIG. 8, the laser beam is emitted on the surface of the workpiece along the locus indicated by the solid line in FIG. 8.

Figure 9:
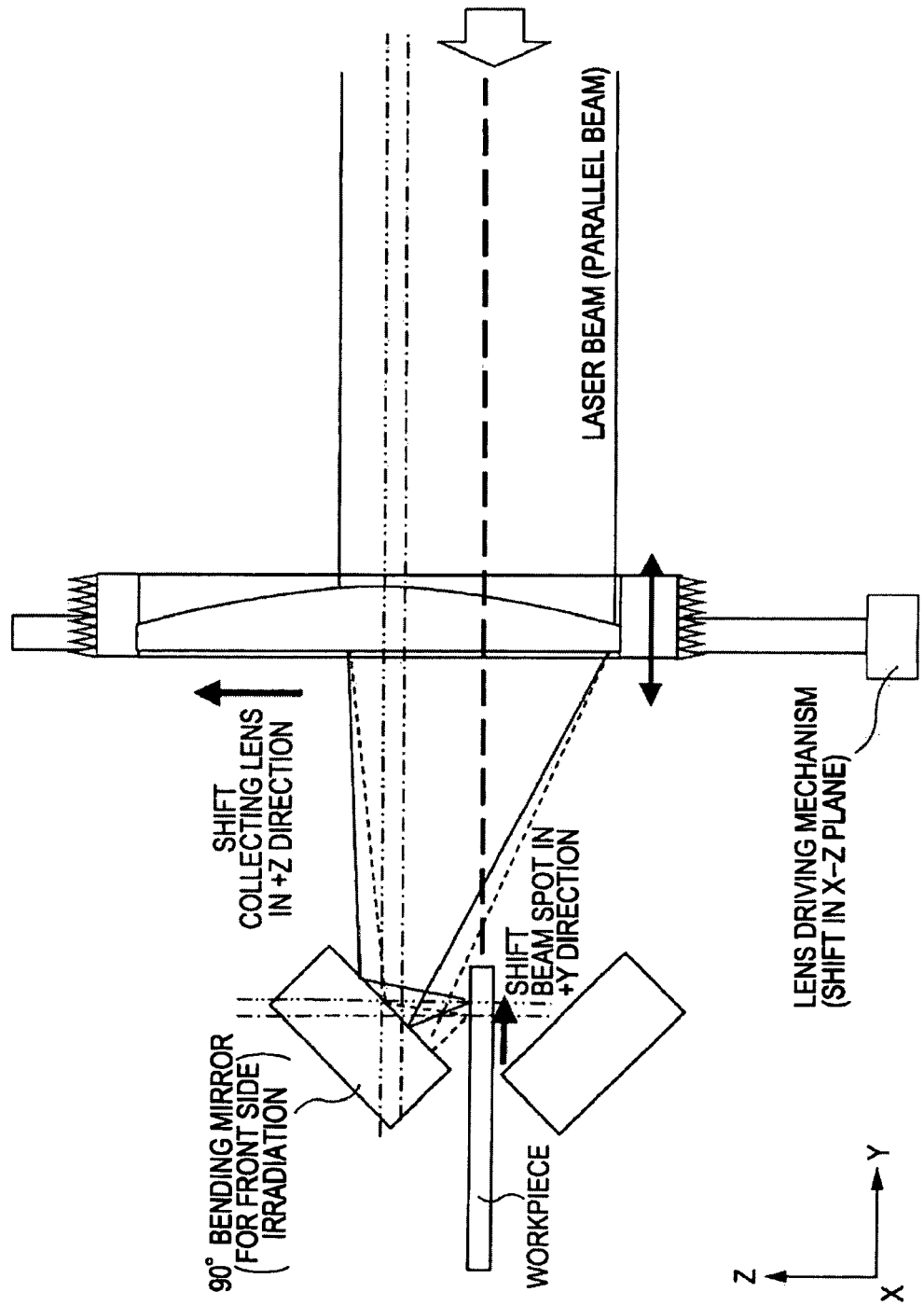
FIG. 9 is an illustration showing an optical scanning operation of the optical scanner according to the example.
Figure 10:
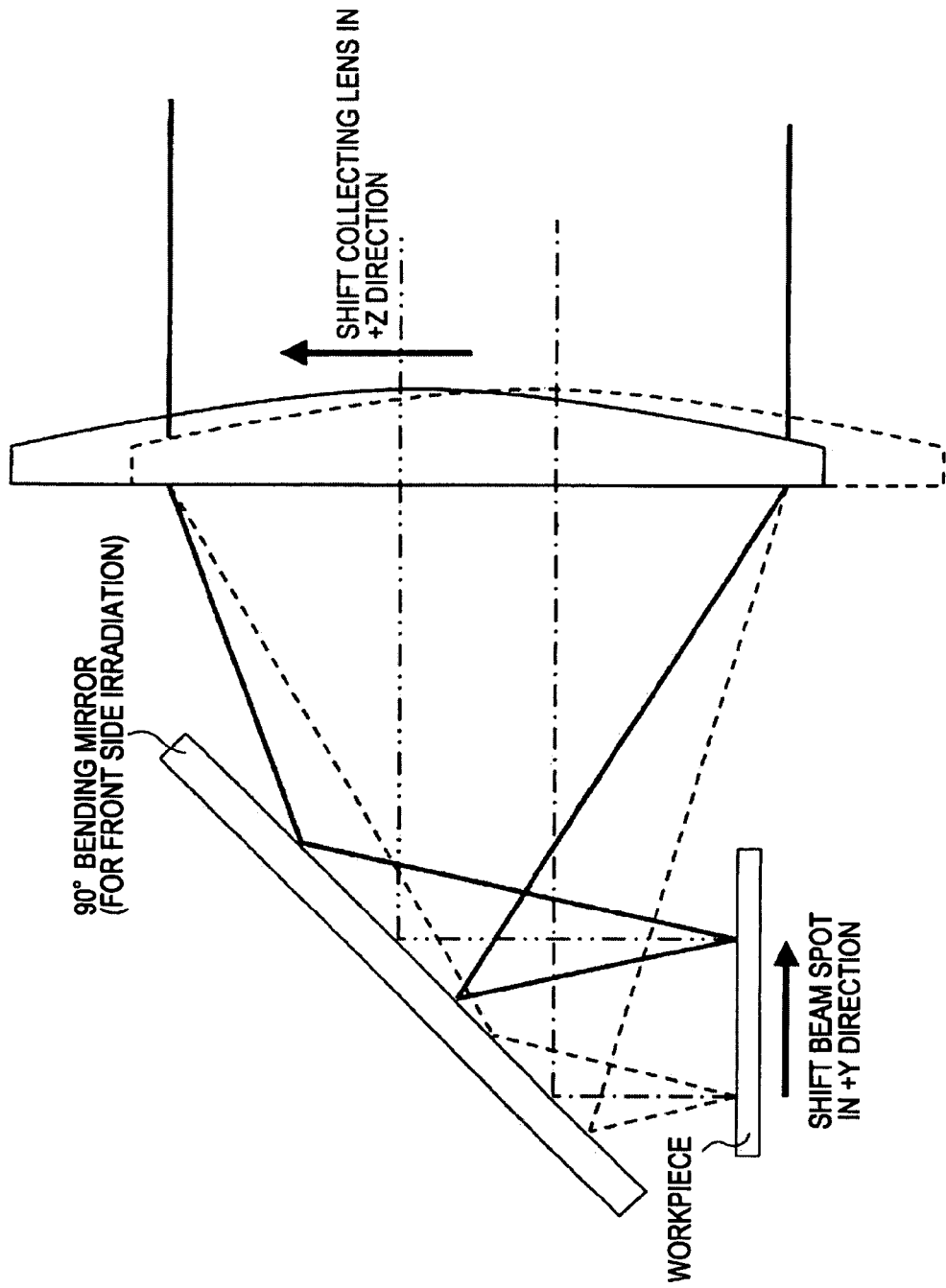
FIG. 10 is an enlarged view showing a primary portion in FIG. 9.

FIG. 9 is an illustration showing another laser scanning operation of the laser scanner of this embodiment. FIG. 10 is an enlarged view showing a primary portion in FIG. 9.

Examples shown in FIGS. 9 and 10 illustrate an operation in which the collecting lens is shifted in +Z direction in the drawing, in contrast to the case in FIGS. 7 and 8. In an initial state, the laser beam is incident on the workpiece along the axis indicated by a dotted chain line in the drawing. The locus of the laser beam at this time is indicated by a thin dotted line. It is assumed that the collecting lens is located at the position indicated by a dotted line in FIG. 10.

Then, as more particularly illustrated in FIG. 10, the collecting lens is shifted in the +Z direction, that is, toward a position indicated by a solid line in FIG. 10. The laser beam is gradually shifted in +Y direction accordingly. When the collecting lens is shifted to the position indicated by the solid line in the drawing, the laser beam is emitted on the workpiece along the axis of a two-dotted chain line in the drawing. A solid line shown in FIG. 10 indicates the locus of the laser beam at the condition that the laser beam is shifted in +Y direction.

As shown in FIGS. 7 to 10, the laser beam bent by the bending mirror can be shifted in the Y-axis direction in the drawing, by shifting the collecting lens in the Z-axis direction. While the laser beam is shifted, a focal position of the laser beam is located on the surface of the workpiece regardless of the position of the collecting lens. Hence, focusing of the laser beam for the collecting lens is not particularly necessary while the laser scanning is operated. As mentioned above, the collecting lens can be shifted along the X-Z plane. Therefore, the laser beam can scan the surface of the workpiece in any direction by appropriately shifting the collecting lens in the X-Z plane. For example, by shifting the collecting lens in the X-axis direction, the laser beam reflected by the bending mirror may scan the workpiece in the X-axis direction.

The scanning locus on the workpiece does not have to be linear, and the locus may be curved as desired corresponding to the manner of shifting the collecting lens. When the laser beam is continuously emitted during the shift of the collecting lens, continuous scanning for the workpiece may be performed. When the laser beam is intermittently turned on, a laser spot in a locus along a predetermined line may be emitted on the workpiece. The continuous scanning or laser irradiation with the spot may be selected depending on the machining detail of the workpiece as desired.

It is possible, to figure out, in advance, the focal position of the laser beam on the workpiece in accordance with the position of the collecting lens. Therefore, by shifting the collecting lens to a desired position, and then turning on the laser beam, irradiation position of the laser beam can be determined.

In the laser scanner of this embodiment, it is not necessary to guide the laser beam using a fiber or the like, and the collecting lens can directly collect the laser beam emitted from the laser source. Therefore, as compared with a conventional device, the laser beam can be collected into a further smaller diameter, and machining of a smaller member can be realized.

In the laser scanner of this embodiment, a substantial driving portion for optical scanning is provided only around the collecting lens. Therefore, laser scanning can be performed by merely shifting a member of a relatively reduced weight, as compared with a scanner that shifts a workpiece itself, or a scanner that shifts a laser irradiation head. Accordingly, scanning with a laser beam at high speed can be performed as compared with the existing scanner.

In the laser scanner of this embodiment, a 90° bending mirror is used, so that a laser-emitting direction emitted from the collecting lens is bent by 90 degrees. Therefore, the entire height of the optical system can be reduced, and the entire scanning mechanism can be reduced in size.

Figure 11:
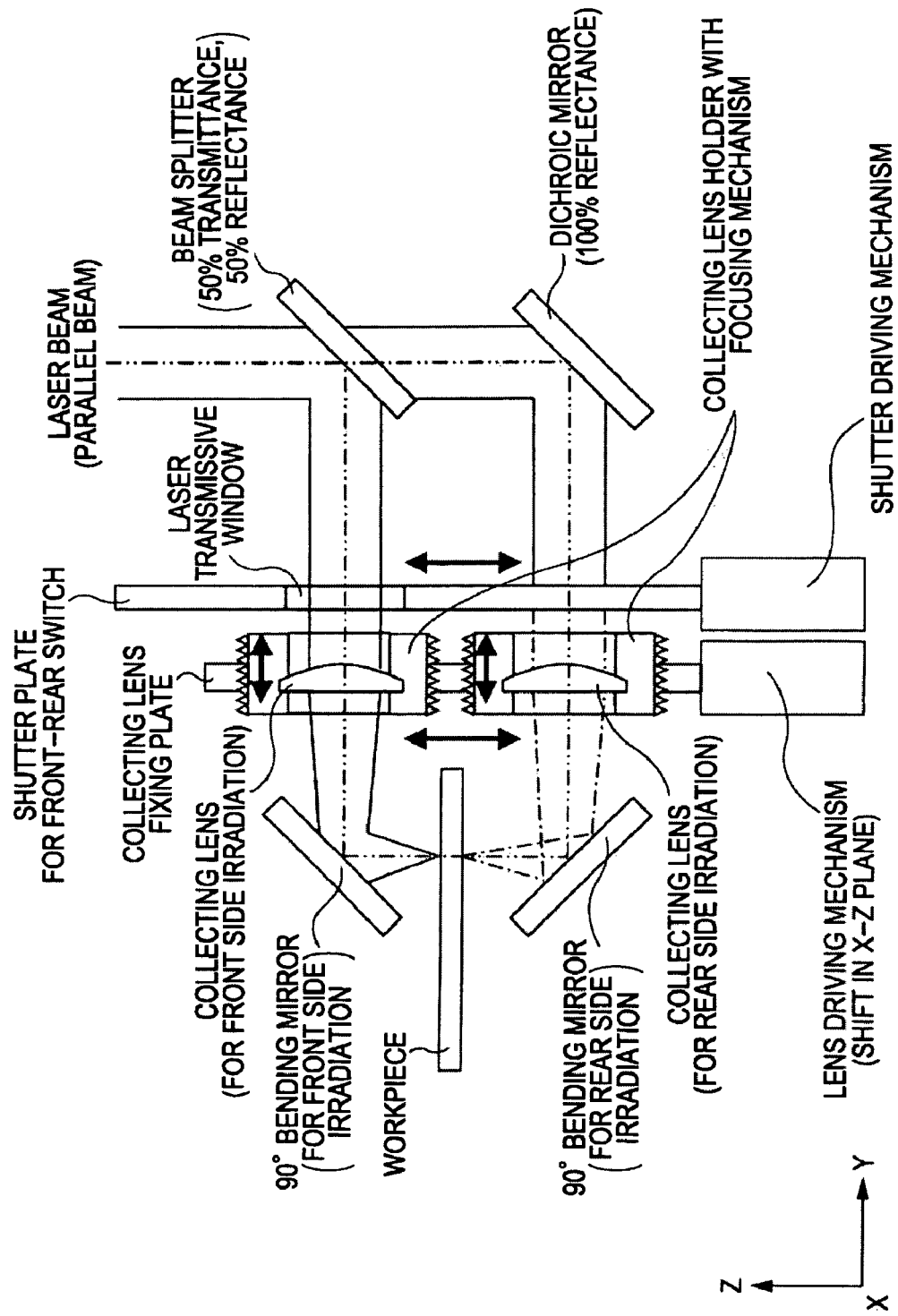
FIG. 11 is an illustration showing an example of an optical scanner having a plurality of collecting lenses.

FIG. 11 is an example configuration of an embodiment of the laser scanner that is slightly modified from the laser scanner described above. A laser scanner shown in FIG. 11 is provided with a plurality of collecting lenses including a front-side collecting lens for irradiating a front side of a workpiece with a laser beam, and a rear-side collecting lens for irradiating a rear side of the workpiece with a laser beam. In the laser scanner of FIG. 11, the front-side collecting lens and the rear-side collecting lens have the same focal length.

The collecting lens shown in FIG. 11 is fixed to a common, collecting lens fixing plate. The collecting lens fixing plate can be shifted in the X-Z plane in the drawing by a lens driving mechanism. The laser scanner of FIG. 11 drives the plurality of collecting lenses at the same time.

A collecting lens holder can adjust the focal position of the laser beam collected by the collecting lens, by using screws like the laser scanner shown in FIG. 4.

The laser beam emitted by a laser source enters a beam splitter. The beam splitter shown in FIG. 11 is a half mirror with 50% transmittance and 50% reflectance, to split the laser beam into a component incident on the front-side collecting lens and a component incident on the rear-side collecting lens.

The laser beam component reflected by the beam splitter is directed to the front-side collecting lens. The laser beam component transmitted through the beam splitter is reflected by a dichroic mirror with 100% reflectance, and then is directed to the rear-side collecting lens. It is assumed that the dichroic mirror reflects light within a wave range corresponding at least to the laser beam for scanning.

A shutter plate is provided between the collecting lens and the laser source (not shown). The shutter plate is used to switch a side of the workpiece to be scanned by the laser beam. The shutter plate has a laser transmissive window, and is shifted in the Z-axis direction in the drawing by a shutter driving mechanism. The laser beam selectively enters the front-side collecting lens or the rear-side collecting lens, resulting in that the front side or rear side of the workpiece is selectively scanned.

When the laser transmissive window is located at the position corresponding to the front-side collecting lens, that is, when the laser transmissive window is in a state shown in FIG. 11, the laser beam transmitted through the laser transmissive window is collected by the front-side collecting lens, reflected by the front-side bending mirror, and then is emitted on the front side of the workpiece along the locus indicated by a solid line in the drawing. In contrast, when the laser transmissive window is located at the position corresponding to the rear-side collecting lens, the laser beam transmitted through the laser transmissive window is collected by the rear-side collecting lens, reflected by the rear-side bending mirror, and then is emitted on the rear side of the workpiece along the locus indicated by a dotted chain line in the drawing.

It is noted that the laser scanner in FIG. 11 can shift the front-side collecting lens and the rear-side collecting lens independently, in the lens-axis direction. Accordingly, the focal position of the front-side collecting lens and the focal position of the rear-side collecting lens can be independently adjusted. Workpiece to be machined by the laser scanner may not have a uniform thickness, and workpieces having various thicknesses may be used. When the thickness of a workpiece varies, the light-collecting state of the laser beam may be changed such that the laser beam is not focused on the surface of the workpiece. Since the laser scanner in FIG. 11 can independently adjust the focal positions of the laser beam for the front and rear sides, focusing suitable to a workpiece can be performed, and a suitable machining condition can be set.

If the shutter plate is not used, front and rear sides of a workpiece can be scanned at the same time as desired, by using laser beams split by the beam splitter. Also, if a mechanism for shifting the front-side collecting lens and the rear-side collecting lens independently in the X-Z plane is used, the workpiece can be scanned with the laser beams along different loci or at different positions for the front and rear sides. Further, a light source for a front side and a light source for a rear side may be independently provided if necessary.

Figure 12:
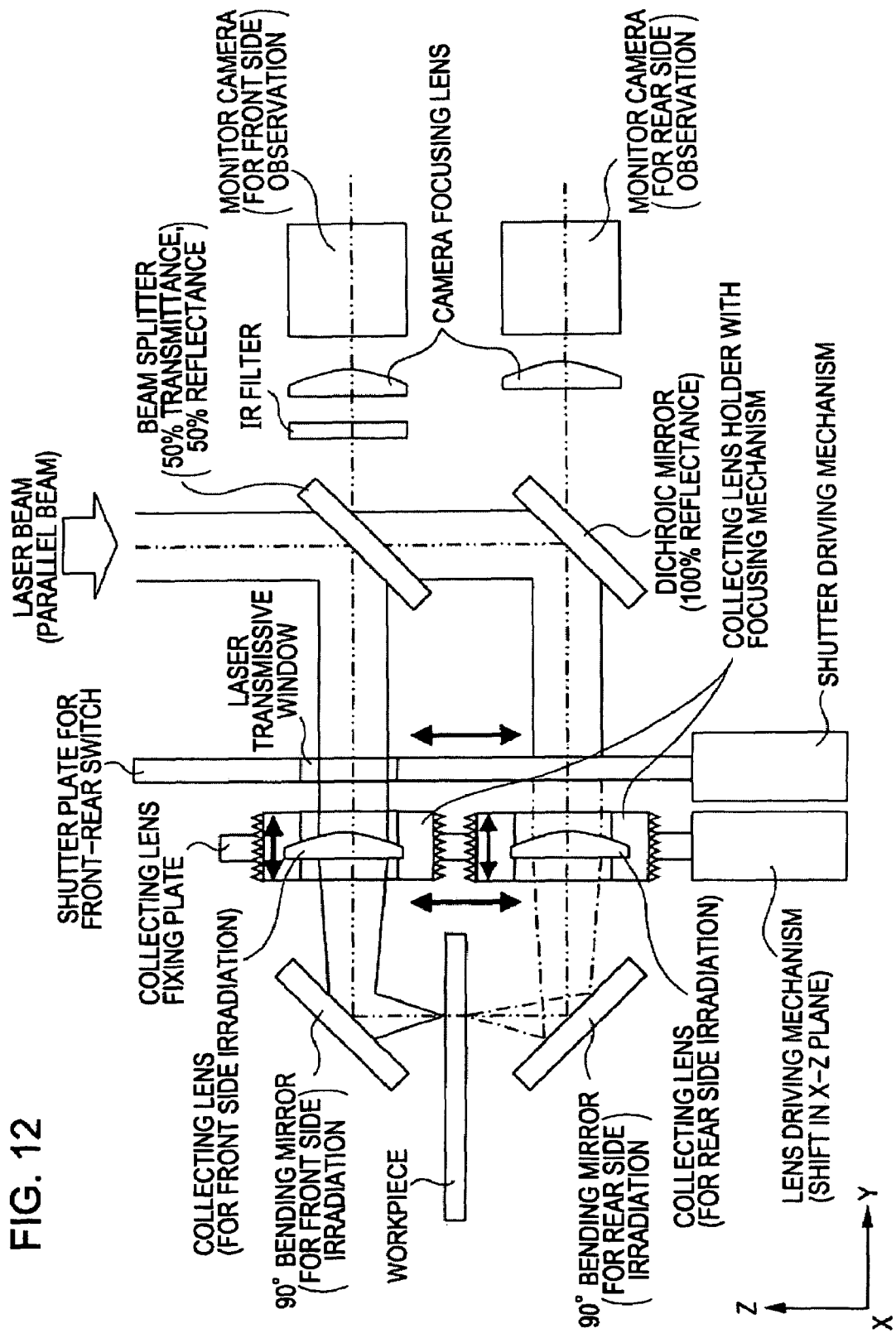
FIG. 12 is an illustration showing another example of an optical scanner having a plurality of collecting lenses.

FIG. 12 is a modification of the laser scanner shown in FIG. 11. The basic configuration in FIG. 12 is similar to the laser scanner in FIG. 11, but is different as the laser scanner in FIG. 12 has monitor cameras for observing front and rear sides of a workpiece. By using the monitor cameras, the machining state of the workpiece, and the light-collecting position of the laser beam can be checked. Also, the image pickup result can be used for the control of laser scanning and machining, Camera focusing lenses are respectively provided in front of the monitor cameras. Also, an IR filter is provided in front of the monitor camera for front-side observation.

Figure 13:
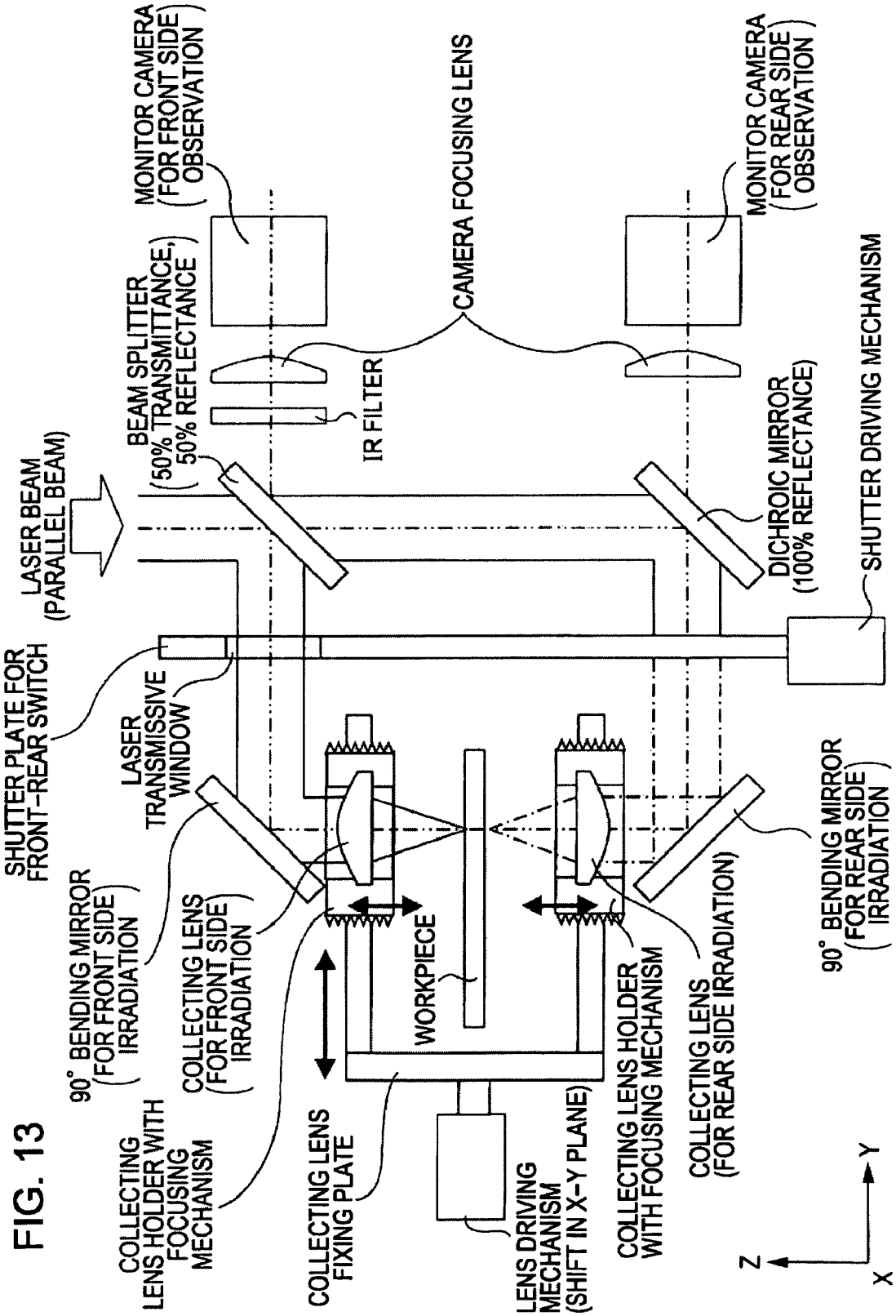
FIG. 13 is an illustration showing still another example of an optical scanner having a plurality of collecting lenses.

FIG. 13 is a modification of the laser scanner shown in FIG. 12.

In FIG. 13, a lens axis of the collecting lens is set in the Z-axis direction. A front-side collecting lens and a rear-side collecting lens are arranged with a workpiece that interposed therebetween. Collecting lens holders of these collecting lenses are connected to an angular C-shaped collecting lens fixing plate at their ends.

The collecting lens fixing plate is driven in X-Y plane. While the collecting lens can be moved in the X-Z plane in the laser scanner in FIG. 12, the collecting lens can be moved in the X-Y plane in the laser scanner in FIG. 13 by shifting the collecting lens fixing plate.

The laser beam emitted by a laser source is split into two components. One component is bent by a front-side bending mirror to be directed in the Z-axis direction, and then enters the front-side collecting lens. The other component of the laser beam is transmitted through the beam splitter, is bent by a dichroic mirror by 90 degrees, then by a rear-side bending mirror by 90 degrees, and enters the rear-side collecting lens.

While a shutter plate is driven along the Z-axis direction in FIG. 13, the shutter plate may be driven along an axis other than the Z-axis.

The configuration in FIG. 12 or the configuration in FIG. 13 may be selected depending on the environment where the laser scanner is used. In the configuration in FIG. 12, the collecting lens is not driven in a direction other than the direction in the X-S plane, Hence, the dimension in the X-Y direction may be relatively small as compared with the configuration in FIG. 13. In contrast, in the configuration in FIG. 13, the dimension in the X-Z direction may be relatively small.

Figure 14:
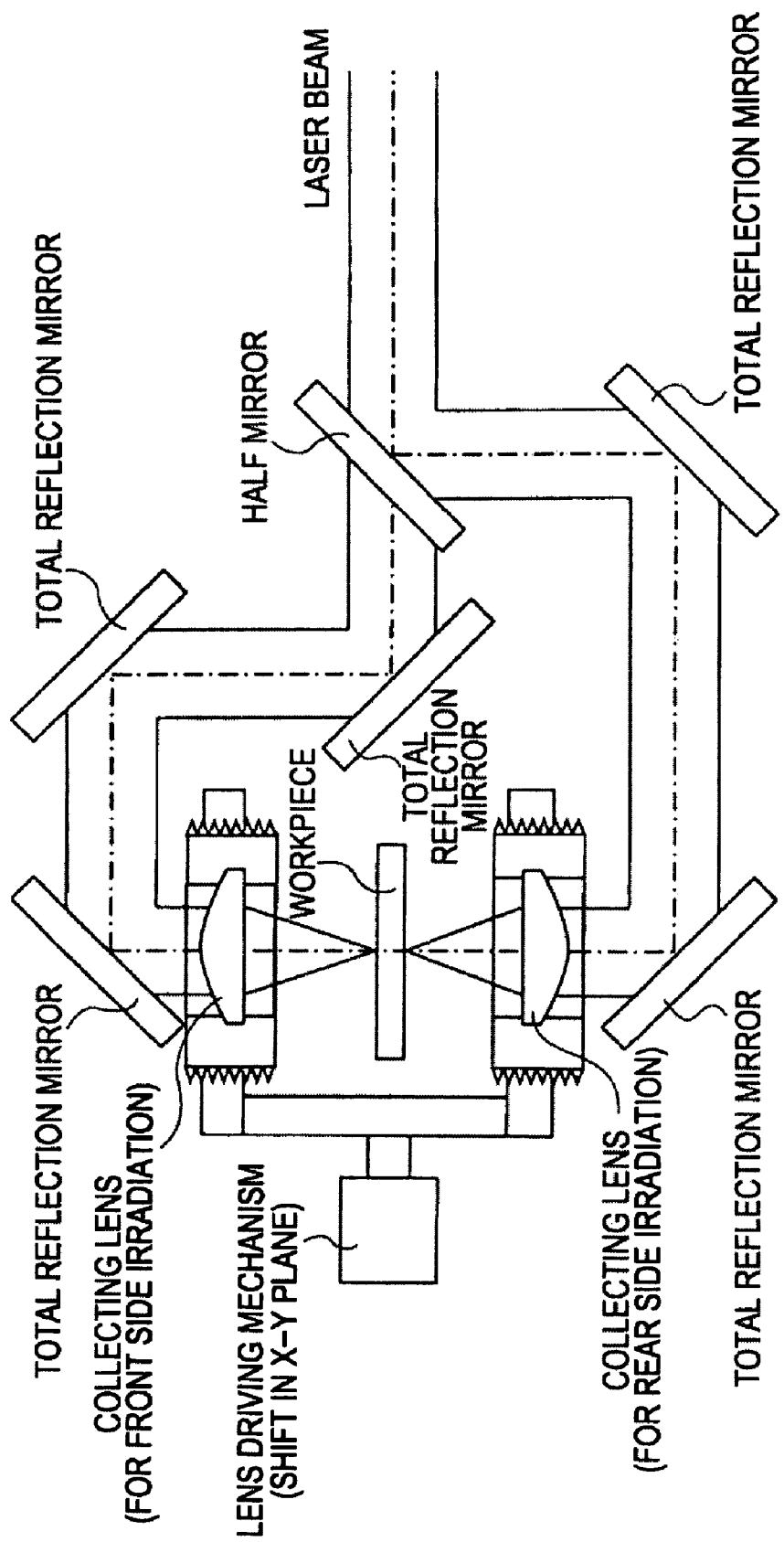
FIG. 14 is an illustration showing an example of an optical scanner with a travel distance of a light beam to a front side is equivalent to that of a light beam to a rear side.

FIG. 14 is a modification of the laser scanner shown in FIG. 13. This modification in FIG. 14 has a half mirror and five reflection mirrors in total. Further, the optical systems are arranged to set a travel distance of a laser beam emitted to a front side of a workpiece to be identical to a travel distance of a laser beam emitted to a rear side of the workpiece. If the laser beam used in the laser scanner has an angle of divergence, it is difficult to obtain an identical light-collecting condition of the laser beam for both the front and rear sides, unless the travel distance of the laser beam to the front side is identical to the travel distance to the rear side. In the example shown in FIG. 14, since a common light-collecting condition of the laser beam is applied to the front and rear sides, the machining state of the workpiece can be stabilized.

Figure 15:
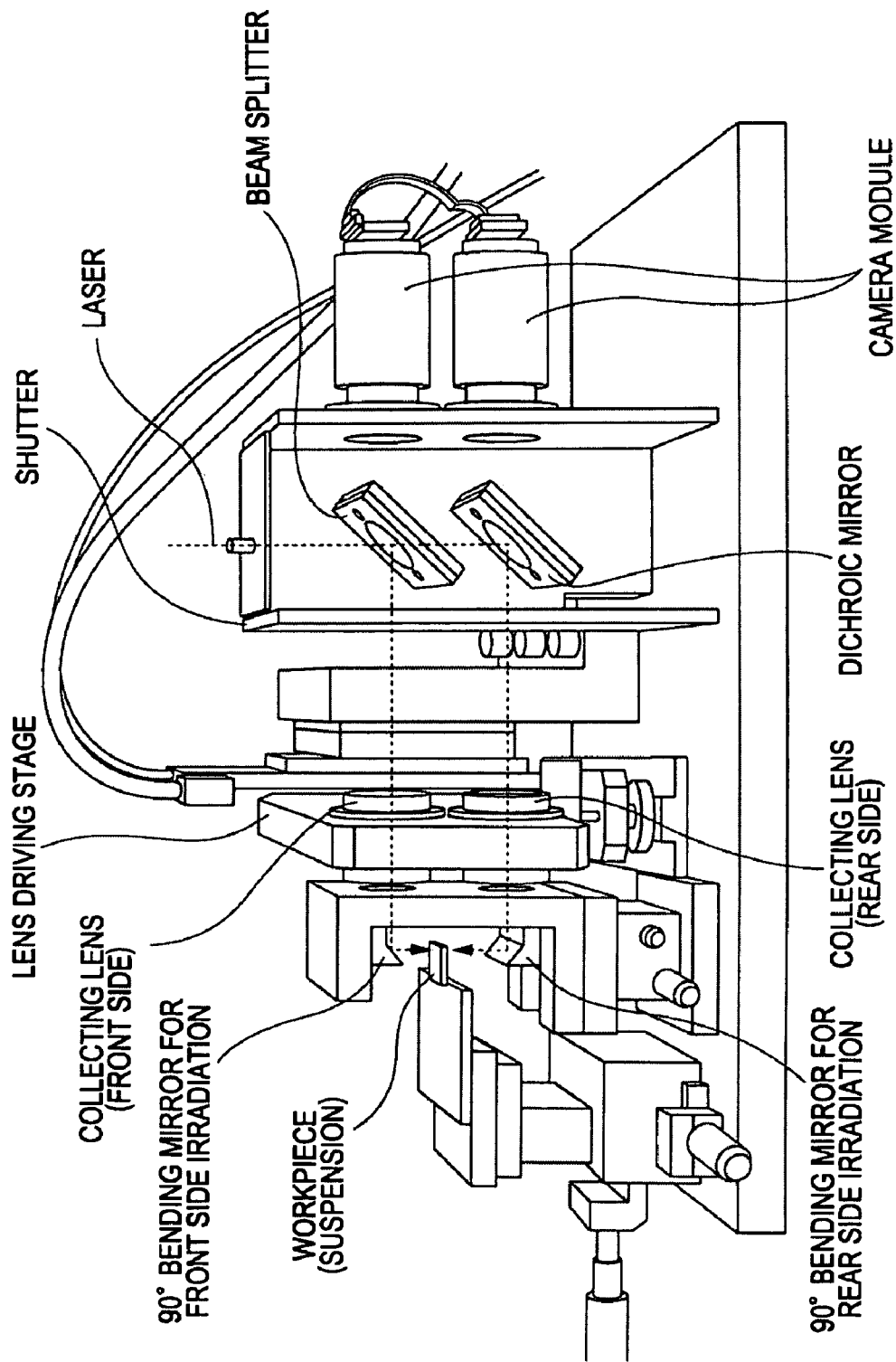
FIG. 15 is an illustration showing an appearance of a laser machine tool according to an embodiment.

FIG. 15 is an illustration showing an appearance of a laser machine tool using the laser scanner in FIG. 12. The laser machine tool in FIG. 15 is expected to machine a suspension as a workpiece by bending, and thus, has a stage on which the workpiece is placed. In addition, a positioning mechanism is provided on the stage for positioning the workpiece.

A beam splitter and a dichroic mirror are arranged in a common case so that positions of both are adjusted. A laser beam is emitted by a laser source (not shown) and enters the beam splitter from above the case. Further, a shutter is provided at the light-emitting side of the case to selectively emit the laser beam reflected by the beam splitter, or the laser beam reflected by the dichroic mirror.

The collecting lens is mounted to a plate-like lens holder. The lens holder is mounted to a lens driving stage. The lens driving stage shifts the collecting lens (lens holder) in a plane, and a surface of a workpiece is scanned accordingly, whereby the workpiece is machined.

A camera provided on the right side of the case shown in FIG. 15 captures an image of the appearance of a surface of the workpiece scanned with the laser beam, by using the beam transmitted through the beam splitter or the dichroic mirror. The image pickup by the camera is transferred to a controller (not shown).

The controller turns on or off the laser source, and drives the lens driving stage and the shutter. In addition, the controller may have a function of finely adjusting a scanning operation on the basis of the image pickup result transferred from the camera.

FIG. 16 is a flowchart showing a laser machining procedure according to an embodiment. The procedure shown in FIG. 16 is a part of a manufacturing procedure of a workpiece such as a suspension.

First, a workpiece is placed on a laser machine tool (step S1). The workpiece may be manually placed, or automatically conveyed. Then, a machining condition of the workpiece is read (step S2). Information unique to the workpiece is used as key information, and information how the workpiece is machined is extracted. This machining condition may be set corresponding to the type of the workpiece, or a machining condition may be set for each individual part for its adjustment.

Then, it is determined whether the laser beam scans the front side or rear side of the workpiece, on the basis of the read machining condition (step S3). If the machining object is the front side, the shutter is shifted so that the laser beam directed to the front side is transmitted therethrough (step S4). In contrast, if the machining object is the rear side, the shutter is shifted so that the laser beam directed to the rear side is transmitted therethrough (step S5).

After the shutter is set, the collecting lens is driven and positioned to a predetermined position, for example, a position where scanning is started (step S6). After the collecting lens is positioned, the laser source is turned on (step S7). The collecting lens is driven corresponding to the machining condition such as a desired scanning locus (step S8). The driving of the collecting lens is controlled by changing its direction, and also, by changing other conditions such as the movement speed.

The operation of step S8 is repeated as desired until the machining of the workpiece is completed. When it is determined that the machining is completed, the laser source is turned off (step S10), and the machining operation is terminated.

If both the front and rear sides of the workpiece have to be machined, one of the sides may be machined, and then the other one may be machined.

With the above configuration, in this embodiment, the scanning mechanism using the laser beam with a smaller diameter, suitable for micromachining, can be obtained.

Also, since the mechanism to be driven for scanning becomes small, high-speed scanning can be performed.

As an embodiment of the machine tool, the light-collecting means may be driven such that its optical axis is shifted in a plane parallel to a plane of the workpiece. Alternatively, as another embodiment of the machine tool, the light-collecting means may be driven such that its optical axis is shifted in a plane orthogonal to the plane of the workpiece.

What is claimed is:

1. A scanning mechanism that scans a scanning object with a light beam, comprising:
    light-collecting means for collecting the light beam that is emitted by a light source;
    driving means for driving the light-collecting means in a direction orthogonal to an optical axis of the light-collecting means;
    first reflecting means provided near a first side of the scanning object, for reflecting the light beam collected by the light-collecting means to allow the light beam to be incident on the scanning object; and
    second reflecting means provided near a second side of the scanning object that is opposite to the first side of the scanning object, for reflecting the light beam collected by the light-collecting means to allow the light beam to be incident on the scanning object.

2. The scanning mechanism according to claim 1, wherein the first reflecting means and the second reflecting means each are arranged to reflect the light beam emitted from the light-collecting means so that the light beam is incident on the scanning object in a direction orthogonal to the scanning object.

3. The scanning mechanism according to claim 1, wherein the first reflecting means and the second reflecting means are arranged at positions each being inclined at 45 degrees with respect to the scanning object.

4. The scanning mechanism according to claim 1, further comprising an adjusting mechanism for adjusting the position of the light-collecting means in a direction along the optical axis thereof.

5. The scanning mechanism according to claim 1, wherein the driving means drives the light-collecting means in a plane perpendicular to the optical axis thereof.

6. A scanning mechanism that scans a scanning object with a light beam, comprising:
    splitting means for splitting the light beam that is emitted by a light source into a first component and a second component;
    first light-collecting means for collecting the first component;
    second light-collecting means for collecting the second component;
    first reflecting means for reflecting the first component emitted from the first light-collecting means to allow the first component to be emitted on a first side of the scanning object;
    second reflecting means for reflecting the second component emitted from the second light-collecting means to allow the second component to be emitted on a second side of the scanning object; and
    driving means for driving the first light-collecting means and the second light-collecting means in a direction orthogonal to an optical axis of each light-collecting means.

7. The scanning mechanism according to claim 6, wherein the first light-collecting means and the second light-collecting means have a common optical property.

8. The scanning mechanism according to claim 6, further comprising light-shielding means for selectively transmitting one of the first component and the second component, and shielding the other one.

9. The scanning mechanism according to claim 6, wherein the first light-collecting means and the second light-collecting means are mounted to single driving means, and are driven at the same time by the driving means.

10. The scanning mechanism according to claim 6, wherein the first light-collecting means and the second light-collecting means respectively have position-adjusting mechanisms for adjusting a position of the first light-collecting means and a position of the second light-collecting means in optical-axis directions thereof.

11. The scanning mechanism according to claim 10, wherein the position-adjusting mechanisms independently adjust the position of the first light-collecting means and the position of the second light-collecting means.

12. The scanning mechanism according to claim 6, further comprising third reflecting means for reflecting a component of the light beam transmitted through the splitting means.

13. The scanning mechanism according to claim 12, wherein the splitting means, the first reflecting means, the second reflecting means, and the third reflecting means are arranged so as to reflect the incident light beam by 90 degrees.

14. A scanning mechanism that scans a scanning object with a light beam, comprising:
   splitting means for splitting the light beam that is emitted by a light source into a first component and a second component;
   first reflecting means for reflecting the first component to allow the first component to be emitted on a first side of the scanning object;
   second reflecting means for reflecting the second component to allow the second component to be emitted on a second side of the scanning object;
   first light-collecting means for collecting the first component;
   second light-collecting means for collecting the second component; and
   driving means for driving the first light-collecting means and the second light-collecting means in a plane orthogonal to an optical axis of each light-collecting means.

15. A scanning mechanism that scans a scanning object with a light beam, comprising:
   first reflecting means for reflecting an incident first light beam to allow the first light beam to be emitted on a first side of the scanning object;
   second reflecting means for reflecting an incident second light beam to allow the second light beam to be emitted on a second side of the scanning object;
   first light-collecting means for collecting the first light beam;
   second light-collecting means for collecting the second light beam; and
   driving means for driving the first light-collecting means and the second light-collecting means in a plane orthogonal to an optical axis of each light-collecting means.

16. The scanning mechanism according to claim 15, wherein the light-collecting means is disposed between the reflecting means and the scanning object.

17. The scanning mechanism according to claim 15, wherein the light-collecting means is disposed upstream of the reflecting means.

18. The scanning mechanism according to claim 15 further comprising:
   first image pickup means for capturing an image of the first side of the scanning object; and
   second image pickup means for capturing an image of the second side of the scanning object.

19. The scanning mechanism according to claim 18, wherein an optical axis of the image pickup means is disposed on the extension of an optical axis of the light beam incident on the reflecting means.

20. The scanning mechanism according to claim 18, wherein an optical filter is disposed in front of the image pickup means.

21. A machine tool that irradiates a front side and/or a rear side of a workpiece with a laser beam to machine the workpiece, the machine tool comprising:
   a stage on which the workpiece is placed;
   a laser source that emits the laser beam;
   light-collecting member that collects the laser beam emitted by the laser source;
   driver that drives the light-collecting member in a plane orthogonal to an optical axis of the light-collecting member;
   first reflecting member that reflects the laser beam collected by the light-collecting member to the front surface of the workpiece when the light-collecting member is located in a first region;
   second reflecting member that reflects the laser beam collected by the light-collecting member to the rear surface of the workpiece when the light-collecting member is located in a second region; and
   controller that controls the laser source and the driver.

* * * * *